Figure 1:
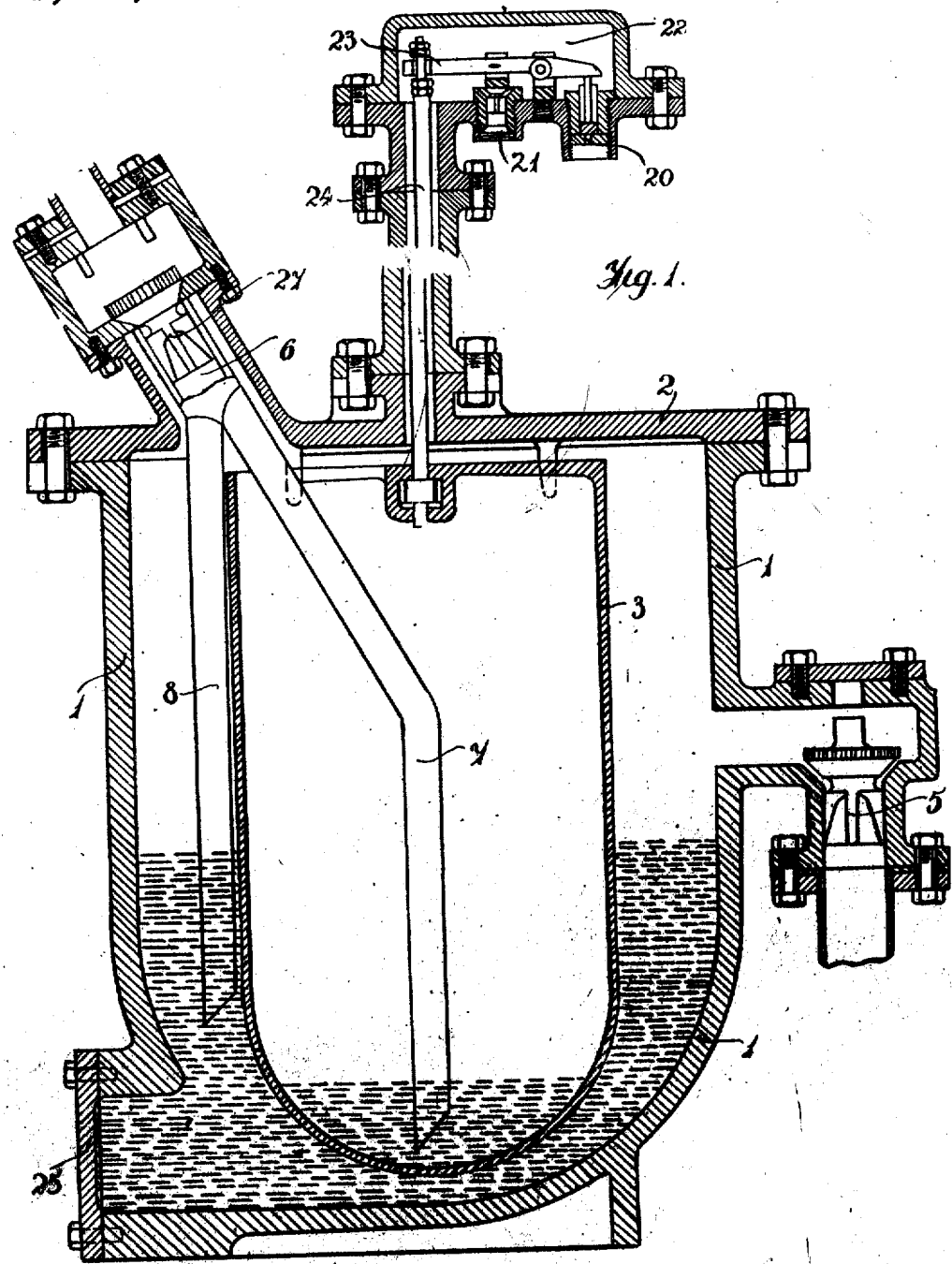

T. BRADBEAR.
APPARATUS FOR ELEVATING OR LIFTING ACIDS OR THE LIKE.
APPLICATION FILED JUNE 18, 1917.

1,261,351. Patented Apr. 2, 1918.

UNITED STATES PATENT OFFICE.

THOMAS BRADBEAR, OF SPARKBROOK, BIRMINGHAM, ENGLAND.

APPARATUS FOR ELEVATING OR LIFTING ACIDS OR THE LIKE.

1,261,351.

Specification of Letters Patent.   Patented Apr. 2, 1918.

Application filed June 18, 1917.   Serial No. 175,486.

*To all whom it may concern:*

Be it known that I, THOMAS BRADBEAR, subject of the King of Great Britain, residing at 16 Medlicott road, Sparkbrook, Birmingham, in the county of Warwick, England, have invented a new and useful Apparatus for Elevating or Lifting Acids or the like; and I do hereby declare the following to be a full, clear, and exact description of the same.

My invention comprises a new or improved elevating or lifting apparatus for acids or the like and has for its object the provision of simple and efficient acid proof mechanism whereby acids may be automatically raised from a low level to a high level.

According to this invention the acid elevator broadly comprises a main casing or body hermetically sealed, within which is located an open-topped float, in combination with an acid inlet valve, a compressed air inlet valve and an air vent; all so arranged that when acid flows in it raises the float which automatically closes the compressed air inlet valve and opens the air vent, the continued inflow of acid finally sinking the float, opening the compressed air valve and closing the air vent, the incoming compressed air then expelling the acid from the interior of the float as well as from partly around the float, with the result that the float will again rise, shut off the compressed air supply and open the air vent, this cycle of operations being automatically repeated.

Referring to the drawings:—

The figure is a vertical section of one form of elevator according to this invention.

In carrying my invention into practice as illustrated upon the accompanying drawings the apparatus comprises a cast iron tank 1 which may be conveniently of circular form in plan rounded at the bottom and flanged at the top to receive a cover plate 2, the connection between which and the tank is hermetically sealed.

Within this tank is placed a float 3 which is of similar shape to the tank but smaller, so that when the float is in position there is an annular space between the outer periphery of the float and the inner periphery of the tank.

The acid is arranged to flow into the tank through a suitable non-return valve 5, the inlet being at a substantial distance above the bottom of the tank.

The acid outlet pipe 6 passes through the cover and has two branches 7, 8, one 7 extending right to the bottom of the interior of the float while the other branch is in the annular space between float and tank and is at a distance from the bottom of the tank, so that while the whole of the acid inside the float is discharged the tank is never entirely emptied, there being always sufficient acid below this delivery branch to support the empty float.

The compressed air inlet valve 20 and air vent 21 are located in a valve casing 22 disposed at a considerable distance above the tank and thus quite clear of all acid attack, both valves being actuated by the one lever 23 controlled by the rod 24 connected to the float and so arranged that when the float rises the valve 20 is closed and the air vent 21 open. The valves and lever are constructed of acid proof material whenever necessary.

In operation, to start the apparatus the compressed air supply is closed and the acid inlet opened, when the acid will flow in, opening the air vent if this is not already opened, the acid continuing to flow into the annular space between tank and float until it finally overflows over the top of the float into the interior of it until there is sufficient acid within the float to sink it, the sinking of the float automatically opening the compressed air valve and closing the air vent. The incoming compressed air then expels the acid from the interior of the float through the one branch of the delivery pipe and part of the acid which is between the tank and the float through the other branch of the delivery pipe, the discharge of acid continuing until the float is empty, but, as previously stated, a certain quantity of acid is always left between the float and tank. When sufficient acid has been discharged the empty float will rise, close the compressed air valve and open the air vent when more acid will flow in and the cycle of operations be repeated automatically.

A check valve 27 may be provided in the delivery pipe to prevent the acid falling back into the tank. A cleaning door 25 is also provided at the foot of the tank when required.

This elevator will elevate or lift weak or strong sulfuric acid, weak or strong nitric, oleum, or any commercial acid (except hydrofluoric) with the same elevator. This means that if a chemical manufacturer installs an elevator, this same elevator will suit practically all purposes.

What I claim then is:—

1. In apparatus for elevating or lifting acids or the like, the combination of a tank sealed in an airtight manner; an open-topped float therein; means for admitting acid to the tank and exterior of the float and later to the interior of the float so as to sink the float; outlet pipes and valves to the tank and interior of the float; and means controlled by the float for admitting compressed air to the interior of the tank when the float sinks; for the purpose specified and substantially as set forth.

2. In apparatus for elevating or lifting acids or the like, the combination of a tank sealed in an airtight manner; an open-topped float therein; means for admitting acid to the tank and exterior of the float and later to the interior of the float so as to sink the float; outlet pipes and valves to the tank and interior of the float; a compressed air inlet valve; an air vent; means controlled by the float for opening the compressed air valve when the float sinks and closing it when the float rises; and means also controlled by the float for closing the air vent when the compressed air inlet is open and opening said air vent when the compressed air inlet is closed; for the purpose specified and substantially as set forth.

3. In apparatus for elevating or lifting acids or the like, the combination of a tank sealed in an airtight manner; an open-topped float therein; a non-return valve for admitting acid to the tank and exterior of the float, said acid ultimately overflowing to the interior of the float; a discharge pipe having a branch passing to the bottom of the interior of the float and a branch passing nearly to the bottom of the tank; a non-return valve in the discharge pipe; a compressed air inlet valve; an air vent; means controlled by the float for opening the compressed air valve when the float sinks and closing it when the float rises; and means also controlled by the float for closing the air vent when the compressed air inlet is open and opening said air vent when the compressed air inlet is closed; for the purpose specified and substantially as set forth.

4. In apparatus for elevating or lifting acids or the like, the combination of a tank sealed in an airtight manner; an open-topped float therein; a non-return valve for admitting acid to the tank and exterior of the float; said acid ultimately overflowing into the interior of the float; a discharge pipe having a branch passing to the bottom of the interior of the float and a branch passing nearly to the bottom of the tank; a non-return valve in the discharge pipe; and means controlled by the float for admitting compressed air to the interior of the tank when the float sinks for the purpose specified and substantially as set forth.

5. In apparatus for elevating or lifting acids or the like, the combination of a tank sealed in an airtight manner; an open-topped float therein; means for admitting acid to the tank and exterior of the float and later to the interior of the float so as to sink the float; outlet pipes and valves to the tank and interior of the float; a valve chamber; a compressed air inlet valve in said chamber; an air discharge valve in said chamber; a controlling lever adapted to open the compressed air valve and close the air valve when said lever moves in one direction and vice versa to close the compressed air valve and open the air valve when it moves in the opposite direction; and a rod connecting said lever to the float for the purpose specified.

6. In apparatus for elevating or lifting acids or the like, the combination of a tank sealed in an airtight manner; an open-topped float therein; means for admitting acid to the tank and exterior of the float and later to the interior of the float so as to sink the float; outlet pipes and valves to the tank and interior of the float; a valve chamber; a compressed air inlet valve in said chamber; an air discharge valve in said chamber; a controlling lever adapted to open the compressed air valve and close the air valve when said lever moves in one direction and vice versa to close the compressed air valve and open the air valve when it moves in the opposite direction; and means connecting said lever to the float.

7. In apparatus for elevating or lifting acids or the like, the combination of a tank sealed in an airtight manner; an open-topped float therein; a non-return valve for admitting acid to the tank and exterior of the float, said acid ultimately overflowing into the interior of the float; a discharge pipe having a branch passing to the bottom of the interior of the float and a branch passing nearly to the bottom of the tank; a non-return valve in the discharge pipe; a valve chamber; a compressed air inlet valve in said chamber; an air discharge valve in said chamber; a controlling lever adapted to open the compressed air valve and close the air valve when said lever moves in one direction and vice versa to close the compressed air valve and open the air valve when it moves in the opposite direction; and a rod connecting said lever to the float for the purpose specified.

8. In apparatus for elevating or lifting acids or the like, the combination of a tank sealed in an airtight manner; an open-topped float therein; means for admitting acid to the tank and exterior of the float and later to the interior of the float so as to sink the float; outlet pipes and valves to the tank and interior of the float; and means controlled by the float for admitting compressed air to the interior of the tank when the float sinks; for the purpose specified and substantially as set forth.

9. In apparatus for elevating or lifting acids or the like, the combination of a tank sealed in an airtight manner; an open-topped float therein; a non-return valve for admitting acid to the tank and exterior of the float; said acid ultimately overflowing into the interior of the float; a discharge pipe having a branch passing to the bottom of the interior of the float and a branch passing nearly to the bottom of the tank; a non-return valve in the discharge pipe; a valve chamber; a compressed air inlet valve in said chamber; an air discharge valve in said chamber; a controlling lever adapted to open the compressed air valve and close the air valve when said lever moves in one direction and vice versa to close the compressed air valve and open the air valve when it moves in the opposite direction; a rod connecting said lever to the float; and a discharge door at the bottom of the tank.

In testimony whereof I affix my signature in presence of two witnesses.

THOMAS BRADBEAR.

Witnesses:
ROBERT BURNS,
HENRY BROCKBANK.